(12) United States Patent
Muñoz De Juan

(10) Patent No.: US 8,789,822 B2
(45) Date of Patent: Jul. 29, 2014

(54) GRIPPING AND RELEASING MECHANISM OF BLANK PIPES IN A MOULD FOR EXPANDING SAID BLANK PIPES—PRIOR TO THEIR MOLECULAR ORIENTATION

(75) Inventor: Ignacio Muñoz De Juan, Mejorada del Campo (ES)

(73) Assignee: Molecor Technologia, S.L., Mejorada del Campo (ES)

( * ) Notice: Subject to any disclaimer, the term of this patent is extended or adjusted under 35 U.S.C. 154(b) by 887 days.

(21) Appl. No.: 12/737,282

(22) PCT Filed: Jun. 23, 2008

(86) PCT No.: PCT/ES2008/070122
§ 371 (c)(1),
(2), (4) Date: Mar. 14, 2011

(87) PCT Pub. No.: WO2009/156524
PCT Pub. Date: Dec. 30, 2009

(65) Prior Publication Data
US 2011/0163489 A1    Jul. 7, 2011

(51) Int. Cl.
*B25B 1/00*    (2006.01)
*B21D 17/04*    (2006.01)

(52) U.S. Cl.
USPC .............................................. 269/37; 72/75

(58) Field of Classification Search
USPC ............ 269/37, 53, 49, 52, 69, 99, 173, 309, 269/310, 54.3; 72/393, 75, 399; 29/234; 279/102, 97, 93, 94; 409/234; 408/226, 408/238, 239 R
See application file for complete search history.

(56) References Cited

U.S. PATENT DOCUMENTS

| 3,507,005 | A |   | 4/1970 | Wiley et al. |
| 3,640,115 | A | * | 2/1972 | Duncan et al. ................ 72/393 |
| 4,340,344 | A |   | 7/1982 | Aston et al. |

(Continued)

FOREIGN PATENT DOCUMENTS

| DE | 25 38 169      | 3/1977 |
| DE | 3428191 A1     | 2/1986 |

(Continued)

OTHER PUBLICATIONS

International Search Report and Written Opinion mailed on Dec. 23, 2008 by the European Patent Office in counterpart foreign application No. PCT/ES2008/070122.

(Continued)

*Primary Examiner* — Lee D Wilson
*Assistant Examiner* — Nirvana Deonauth
(74) *Attorney, Agent, or Firm* — Abelman, Frayne & Schwab

(57) ABSTRACT

This mechanism offers a simple solution wherein an axial movement of a grooved piece (6) brings about a radial movement of rigid balls (5) that grip and deform a pipe (1) that is initially in a plastic state. Depending on the geometry of the channels (7) of the grooved piece (6), a variable grip is achieved. This gripping operation is simply released as the grooved piece (6) returns to its initial position, the pipe (1) itself now being in a solid state, so that the balls (5) are returned to their initial position. The correct position for gripping the plastic pipe can be detected by a detector (11). The pressurization of the plastic pipe can be achieved thanks to an elastic joint (10) on the piece that surrounds the pipe (1).

6 Claims, 5 Drawing Sheets

(56) References Cited

U.S. PATENT DOCUMENTS

| | | |
|---|---|---|
| 4,428,900 A | 1/1984 | Riley et al. |
| 4,499,045 A | 2/1985 | Obsomer |
| 4,512,178 A | 4/1985 | Blevins et al. |
| 5,928,241 A | 7/1999 | Menut |
| 6,106,273 A | 8/2000 | O'Dell |

FOREIGN PATENT DOCUMENTS

| | | |
|---|---|---|
| DE | 3518506 A1 | 11/1986 |
| DE | 196 44 158 A1 | 4/1998 |
| EP | 0072064 | 2/1983 |
| EP | 0611614 A1 | 8/1994 |
| ES | 131894 | 4/1968 |
| ES | 257637 | 10/1981 |
| ES | 2182979 | 3/2003 |
| GB | 124993 | 4/1919 |
| JP | 56038228 | 4/1981 |
| JP | 11210969 | 8/1999 |
| WO | WO 85/01011 A | 3/1995 |
| WO | WO9856567 | 12/1998 |

OTHER PUBLICATIONS

International Preliminary Report on Patentability, completed Jul. 16, 2010 by the European Patent Office in counterpart foreign application No. PCT/ES2008/070122.

* cited by examiner

GRIPPING AND RELEASING MECHANISM OF BLANK PIPES IN A MOULD FOR EXPANDING SAID BLANK PIPES—PRIOR TO THEIR MOLECULAR ORIENTATION

CROSS-REFERENCE TO RELATED APPLICATIONS

This application is a 371 of PCT/ES2008/070122, filed Jun. 23, 2008, from which priority is claimed, the disclosure of which is incorporated herein by reference and made a part of this application.

OBJECT OF THE INVENTION

The present invention lies within the field of methods of producing molecularly oriented profiles, particularly in-batch systems, and it relates to a simple, effective and error-free gripping mechanism for blank pipes in a plastic state (hot), which makes it possible in turn to apply a gripping force and a variable movement, using a system that includes balls made from a hard material, preferably metal.

The object of the invention is to secure the ends of the blank pipe to the mould before it is reliably oriented, with the difficulty that the pipe is in a plastic state, and is therefore easily deformable, but it must also be protected from producing shavings, and in particular it must be possible to release the grip correctly, bearing in mind that during the process there could be a change in the state of the plastic pipe and it could solidify.

BACKGROUND OF THE INVENTION

There are different methods or systems for producing oriented pipes, which can be grouped into two broad categories: Continuous or in-line systems and discontinuous or in-batch systems.

Discontinuous or in-batch systems are mostly based on producing the molecular orientation "item by item", which is achieved by expanding the blank in a mould that provides the final shape of the tubular profile.

In-line processes are radically different and the orientation takes place continuously and simultaneously to the extrusion itself, there being no interruption in the process, or intermediate stock, etc.

Returning to the in-batch molecular orientation process, the blank pipe is placed inside a mould and is expanded against it by means of internal pressure, it being a fundamental part of the process to secure the pipe in a plastic state that is to be expanded. The internal pressure that is generated inside the pipe causes an axial stress that separates the plastic pipe from its grips. Depending on the working conditions, these stresses can be high and abrupt. Bearing in mind that the pipe is in a plastic state, i.e. with an elastomer-like appearance and easily malleable, it is difficult to ensure that it is reliably secured, as the grips themselves deform the pipe that is being secured and it may slide out of them. Furthermore, as it is soft, this plastic is particularly sensitive to tearing, producing shavings, etc., and if this happened, it could eventually jam the system and render the mechanism for continuous use inoperative. Additionally, for the pipe that is to be oriented to be in a plastic state it must be hot, at temperatures above 100° C., which makes it difficult to use grips made from materials other than metals, such as polymers.

Numerous patent documents could be cited that use ball systems to lock two solid pieces together, or patents that explain methods of securing pipes to their moulds.

The first group includes ES 131894 and JP 11210969. Both patents disclose a fast connection system for pipes, with the characteristic that in both cases the pieces to be gripped are solid, i.e. they cannot be deformed by the action of the connection mechanism. Furthermore, the balls only act as a blocking element of the pieces and not as a pressure element.

Other documents are cited below, the concept of which is to lock the pieces:

DE 3518506: "Low pressure closure for gaseous and fluid media, having a ball/detent connection"

ES 2182979 "Quick connection method and device, and surgical instrument for driving interchangeable rotary tools"

ES 2576637: "Quick connection device for tubular bodies"

The following examples of systems for manufacturing oriented pipes with moulds could be cited:

WO9856567: "Process for fabricating an axially oriented plastic pipe thus obtained"

U.S. Pat. No. 4,340,344: "Apparatus for manufacture of thermoplastics pipes"

U.S. Pat. No. 4,428,900: "Method of forming a pipe of oriented thermoplastic polymer"

EPO 0072064: "Method and apparatus for manufacturing molecular oriented tubes"

All these patents use rudimentary connection systems, by simple clamping of two segmented semi-circumferential pieces or by simple pressure. This is because in these devices the pipe to be oriented is gripped in a cold, solid state, being heated in the mould itself. The concept of inserting a heated pipe for molecular orientation is a concept disclosed in patent applications filed by the same applicant as the present invention.

There are also several solutions for making permanent deformations on already fabricated and oriented pipes or tubes. Amongst said solutions, it's worth mentioning:

U.S. Pat. No. 3,640,115: "Tube spacer tool"

EP0611614: "Device for forming a mechanical connection between two concentric tubes"

U.S. Pat. No. 4,512,178: "Tube and deforming tool"

As earlier stated, the above mentioned documents describe solutions for forming permanent deformations in plastic pipes.

Furthermore, the German patent application DE3428191: "Process for producing a pressure-resistant packaging container" describes gripping and releasing tools configurations which are not suitable to be used in a mould for expanding pipes.

DESCRIPTION OF THE INVENTION

The present invention proposes a simple mechanism that overcomes the above-described problems of gripping the ends of a hot polymer pipe, in a plastic state, to its mould for its subsequent orientation. The mechanism takes into consideration the difficulties of this process, treating a soft material that can flow, produce shavings, have significant dimensional clearance, and even return to a solid state after the process.

Firstly, the mechanism comprises a drilled tubular piece provided with tapered radial holes that allow the partial insertion of gripping balls, made from a hard material, preferably metal. Depending on the geometry of the holes, the balls may move to a varying extent in a radial direction.

The mechanism also has at least one grooved tubular piece that can move axially, which is provided with longitudinal channels of a variable depth, of dimensions such that it can house the gripping balls at its maximum depth. The width of these channels corresponds to the diameter of the gripping balls plus a little clearance that allows these balls to be guided in their movement without friction. The channel curves upwards from its point of maximum depth, so that as a consequence of the axial movement of the grooved piece relative to the drilled piece, the base of the channel pushes the balls in a radial direction. Due to their radial movement these balls are inserted into the pipe to be oriented that is in a plastic state, thus deforming it.

The mechanism also comprises a tubular piece of suitable dimensions to concentrically receive the plastic pipe and support said pipe so that when the balls begin their radial movement, they "penetrate" into the pipe and there is not a generalised deformation, which would prevent the pipe from being firmly gripped. Obviously, the pipe is gripped thanks to the pressure of the balls on the plastic pipe, which in turn is limited in its movement by the fixed piece, which results in points of deformation and tension. In the area opposite the ball, this fixed piece could have a rough surface finish that improves the grip on the pipe.

To release the plastic pipe, the grooved piece is withdrawn to its initial position, leaving the balls free to move to their original position, i.e. they are retracted again. However, as nothing pushes them into their initial position, they remain there, and it is the plastic pipe itself that has solidified after contact with the cold balls, which causes the balls to retract as the pipe is removed by traction and a longitudinal movement. It is therefore the previously gripped pipe itself that is now what pushes the balls back once they are free from pressure.

This invention can take different forms, but always under the same concept. In a first embodiment, the balls press the pipe outwards against the fixed tubular piece; in a second embodiment, the balls press the pipe inwards against the fixed tubular piece; and in a third embodiment there are two lines of balls partially incorporated into the corresponding grooved pieces, wherein one line of balls moves radially outwards and the other moves radially inwards as the grooved pieces move, securing the pipe between the two lines of balls.

The mechanism can additionally include an axial actuation mechanism that allows the axial movement of the grooved piece to move the balls, which can be integrated into the system itself or can use external elements, such as hydraulic or pneumatic pistons, threaded rods, etc.

Another auxiliary element of the mechanism would consist of joints that make it possible to establish a seal inside the plastic pipe and pressurisation inside the pipe.

Additionally, the mechanism can include a detector in the cavity where the plastic pipe that is to be oriented must be housed, which detects and indicates that the position of the pipe is correct so that it can subsequently be gripped.

Unlike other gripping solutions that include balls, according to the present invention the gripping force will be regulated and distributed at will. Another important difference lies in the fact that in other cases the movement of the balls is set and depends on the geometry of the pieces, whereas in the present invention it will be possible to regulate the movement of the ball and thereby the degree to which it penetrates into the plastic pipe.

Another fundamental difference between the present invention and other solutions in the state of the art relates to the fact that the proposed mechanism requires constant tension, and the plastic pipe must rest on the fixed piece in response to the pressure applied by the balls, so that plastic pipe is clamped between the fixed piece and the balls, whereas in other devices the connection pieces are self-locking.

Another differentiating characteristic is that in other solutions the piece to be gripped has housings in which the balls are housed, establishing the coupling situation, whereas in the present invention the balls deform the pipe when they are coupled.

It is also important to stress that with this proposed invention it is possible to secure pipes in a plastic state with variable dimensions or large clearances, as the system makes it possible to graduate the grip in terms of movement and strength, whereas in other gripping solutions the pieces to be joined have fixed, tight dimensions.

DESCRIPTION OF THE DRAWINGS

To complete this description and in order to aid a better understanding of the invention's characteristics, according to several preferred practical embodiments thereof, there are three sheets of illustrative and non-limiting plans integral to said description, which are as follows.

PREFERRED EMBODIMENT OF THE INVENTION

In view of the figures, preferred embodiments of the mechanism for gripping blank pipes (1) in the mould (30) prior to their molecular orientation that constitutes the object of this invention are described below.

The mechanism is applicable to a blank pipe (1) that is made from a preferably polymeric material, which is hot, deformable and in a plastic state.

Figure 1:
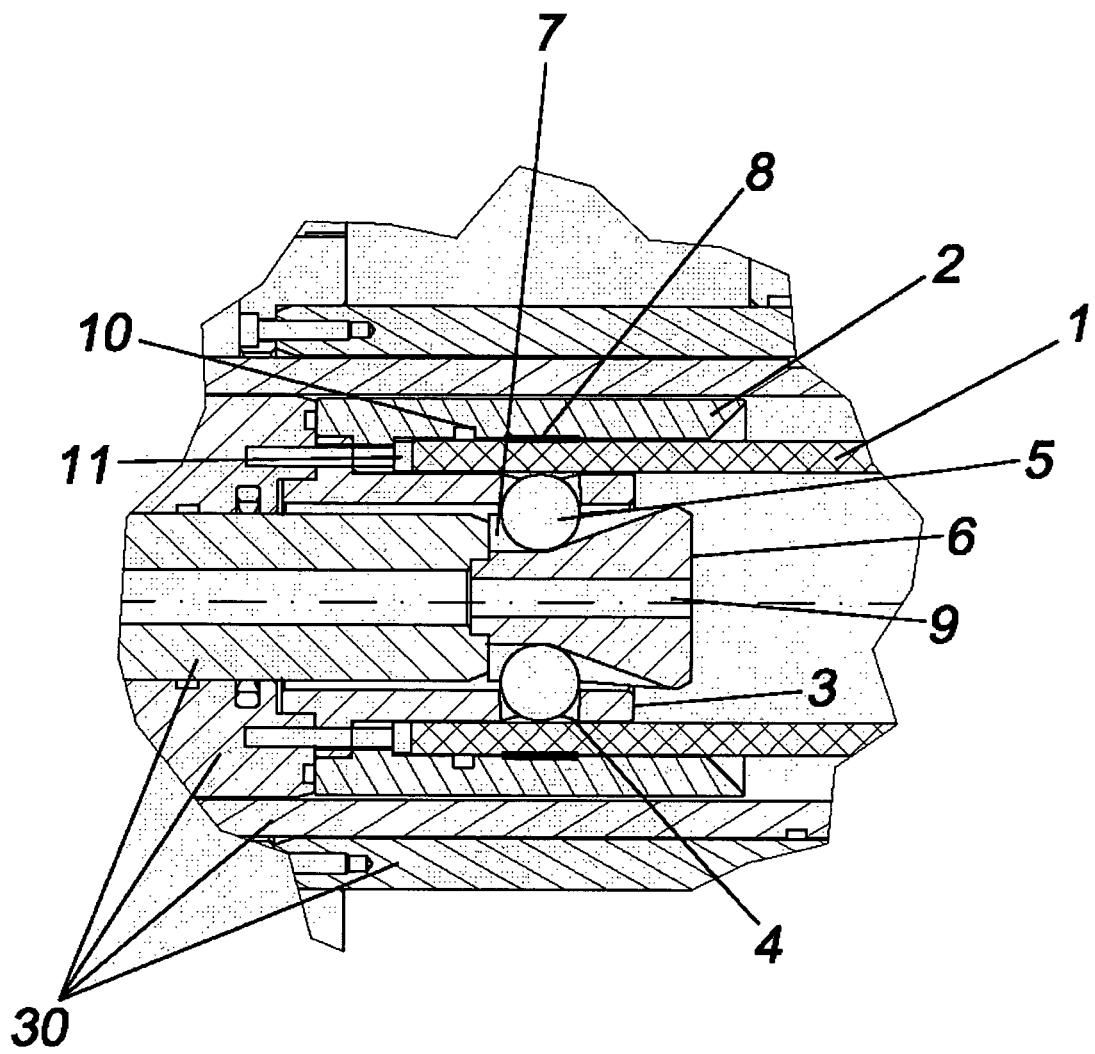
FIG. 1 shows a cross-sectional view of a mechanism for gripping blank pipes in a mould prior to their molecular orientation equipped with inner balls, showing the pipe therein before it is gripped.

According to FIG. 1, it can be observed that the mechanism comprises:

- a fixed tubular piece (2) of suitable dimensions to receive therein the outer face of the pipe (1),
- a drilled tubular piece (3) of suitable dimensions for the outside thereof to receive the inner face of the pipe (1), which is provided with tapered radial holes (4) of an outer diameter that is smaller than the inner diameter, in which a line of rigid, preferably metal balls (5) is partially and moveably housed,
- a grooved tubular piece (6) that can move axially inside the drilled piece (3), which is provided with longitudinal channels (7) that are slightly wider than the diameter of the balls (5) and with a variable depth, in which the balls (5) are partially housed, where the distance between the maximum depth of the channel (7) and the outer face of the drilled piece (3) is greater than the diameter of the ball (5), and where the axial movement of the grooved piece (6) determines the radial movement of the ball (5) towards the pipe (1), securing it, or in the opposite direction, releasing it.

The part of the inner face of the fixed tubular piece (2) that corresponds with the position of the pipe (1) against which the ball (5) rests has a rough surface (8) that improves the grip of the pipe (1) between the balls (5) and the fixed tubular piece (2).

The axial movement of the grooved piece (6) can be driven by any mechanical or electrical means, such as hydraulic pistons, threaded rods, etc., which are not shown here.

It can be observed that in this case the grooved piece (6) is also the piece that allows the passage of the expansion fluid that causes the blank pipe (1) to expand, for which it has an axial hole (9) for this purpose that connects the inside of the pipe (1) with the outside of the mould.

The fixed tubular piece (2) can also include an elastic joint (10), preferably an O-ring, to seal the blank pipe (1) that is to be expanded.

The mechanism can have a detector (11) situated between the drilled piece (3) and the fixed tubular piece (2) as a detection element of the correct position of the pipe (1) that acts as a limit against which the pipe (1) rests, thus detecting the correct position for the subsequent gripping thereof.

Figure 2:
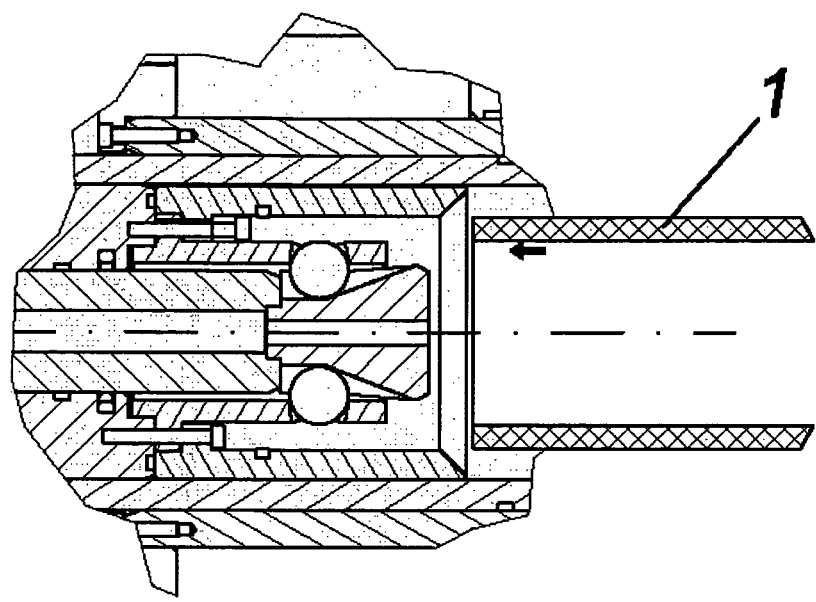
FIGS. 2 to 4 show cross-sectional views of the mechanism shown in FIG. 1, in which the sequence corresponding to the insertion, gripping and release of the pipe can be observed.
Figure 3:
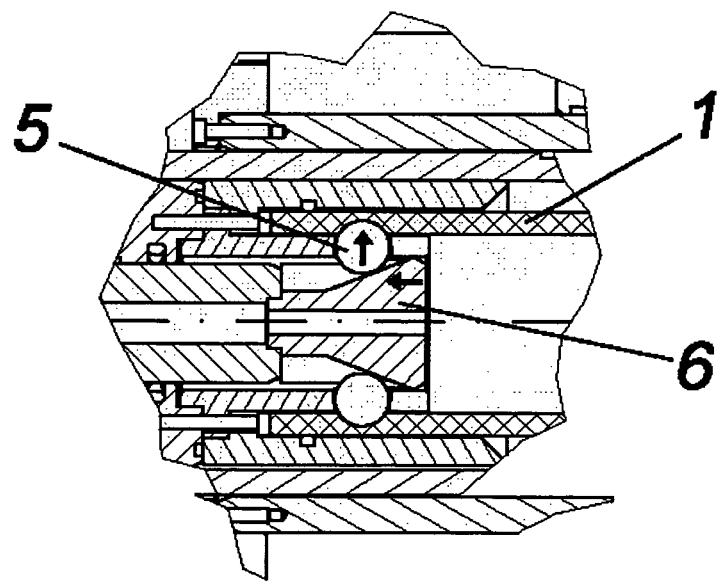
Figure 4:
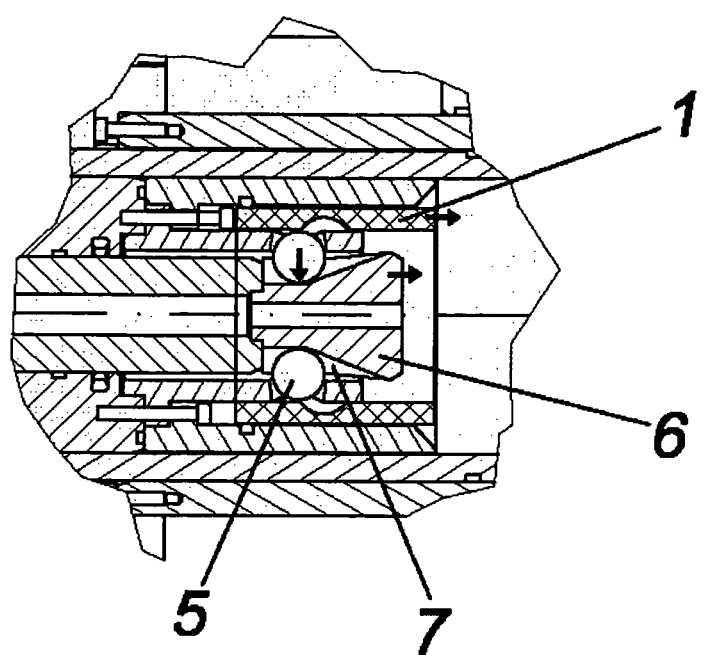

FIGS. 2 to 4 shows the sequence of actuation of the mechanism shown in FIG. 1. FIG. 2 shows the insertion of the pipe (1) in a plastic state into the gripping mechanism, as shown by the arrow indicating the direction of movement of the pipe (1).

In FIG. 3 it can be observed that the grooved piece (6) moves axially in the direction of the arrow, and as it moves it pushes the balls (5) outwards. The balls (5) penetrate into the plastic pipe (1), gripping it and deforming it until they reach the limit established by the radial hole (4).

After the expansion and orientation process of the pipe (1) inside the mould, the grooved piece (6) moves again into its initial position, as can be seen in FIG. 4. The balls (5) are free to move radially. As the pipe (1) is removed once it has been oriented, and is therefore in a solidified state; the geometry of the deformation undergone by the balls (5) causes them to move into their original position, it being the pipe (1) itself that, in its axial releasing movement, pushes the balls (5), which will not put up resistance, to the position of maximum depth of the channel (7).

Figure 5:
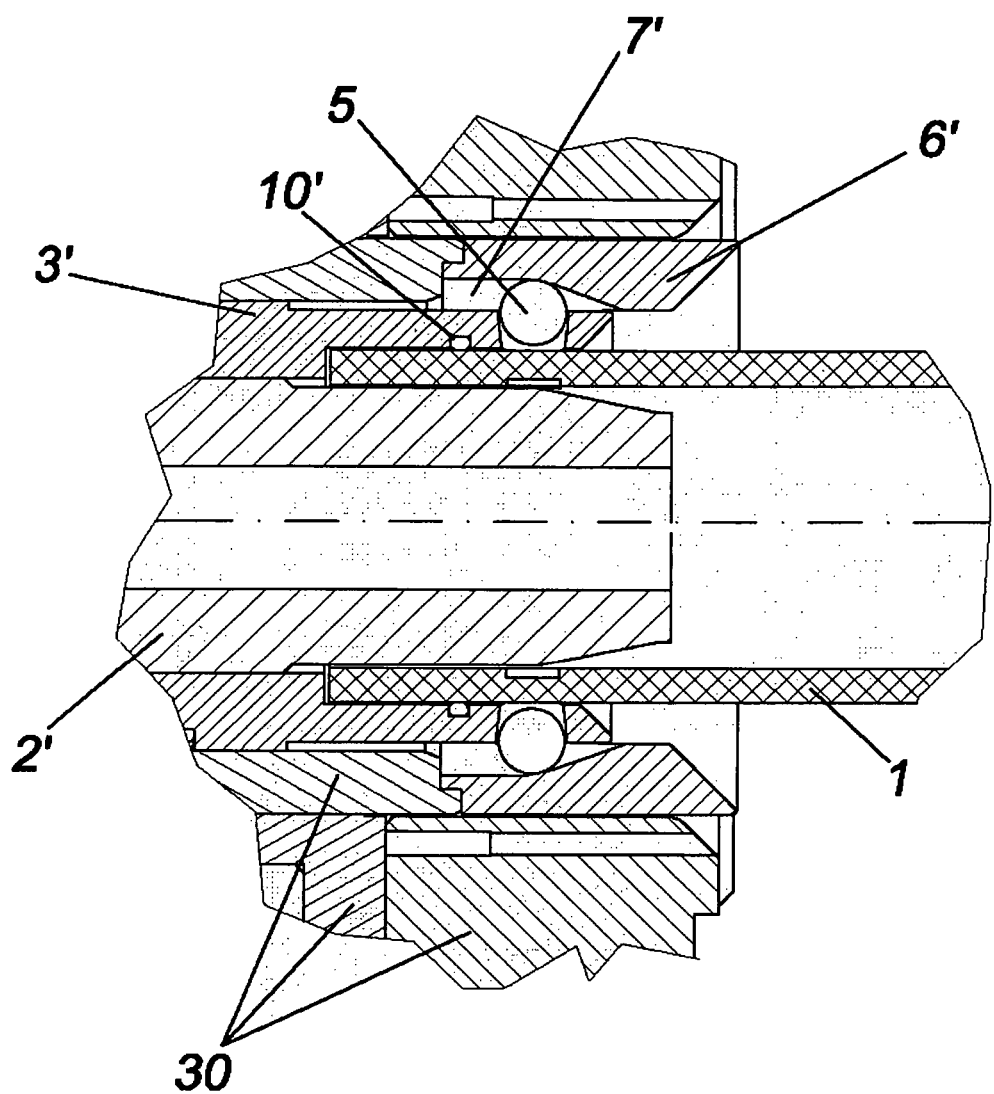
FIG. 5 shows a cross-sectional view of the mechanism for gripping blank pipes equipped with outer balls with the pipe situated therein before it is gripped.

According to a second variant of the invention shown in FIG. 5, the mechanism consists of a system of outer balls, wherein the plastic pipe (1) is gripped by the balls (5) as a consequence of the radial movement of the balls (5) inwards. In this case the grooved piece (6') is situated outside the plastic pipe (1) to be gripped and concentric thereto and the fixed tubular piece (2') is situated inside the plastic pipe (1). Said fixed tubular piece (2') can have a rough surface (8) to improve its grip. The drilled piece (3') is situated outside the plastic pipe (1) and inside the grooved piece (6') and it has a joint (10') to seal it.

Figure 6:
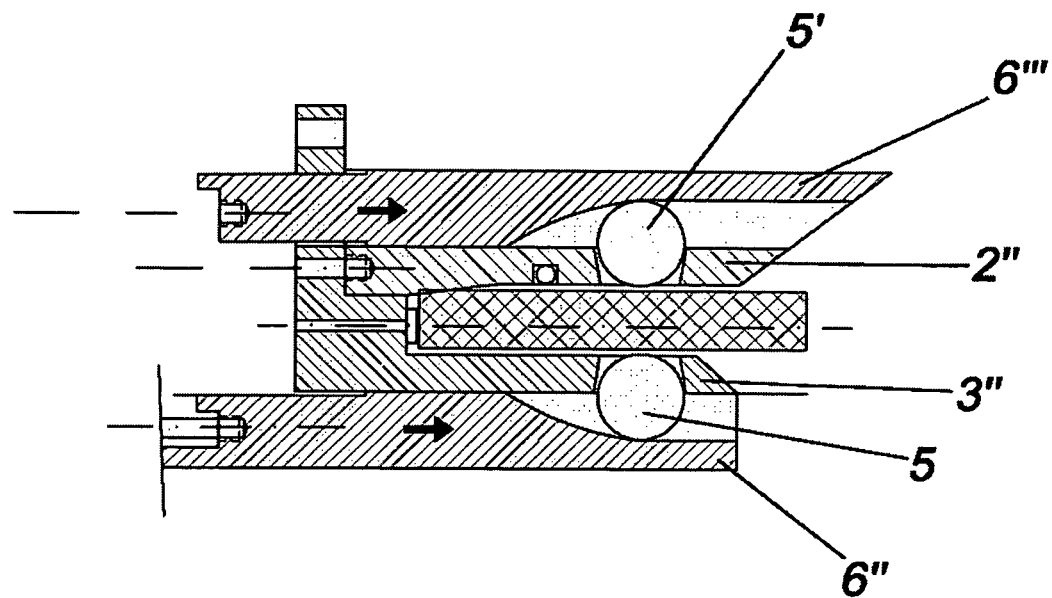
FIGS. 6 and 7 shows cross-sectional views of the mechanism for gripping pipes equipped with two lines of balls, in which it is possible to observe the pipe situated therein before its position is secured, and the locking situation of the pipe in FIGS. 6 and 7, respectively.
Figure 7:
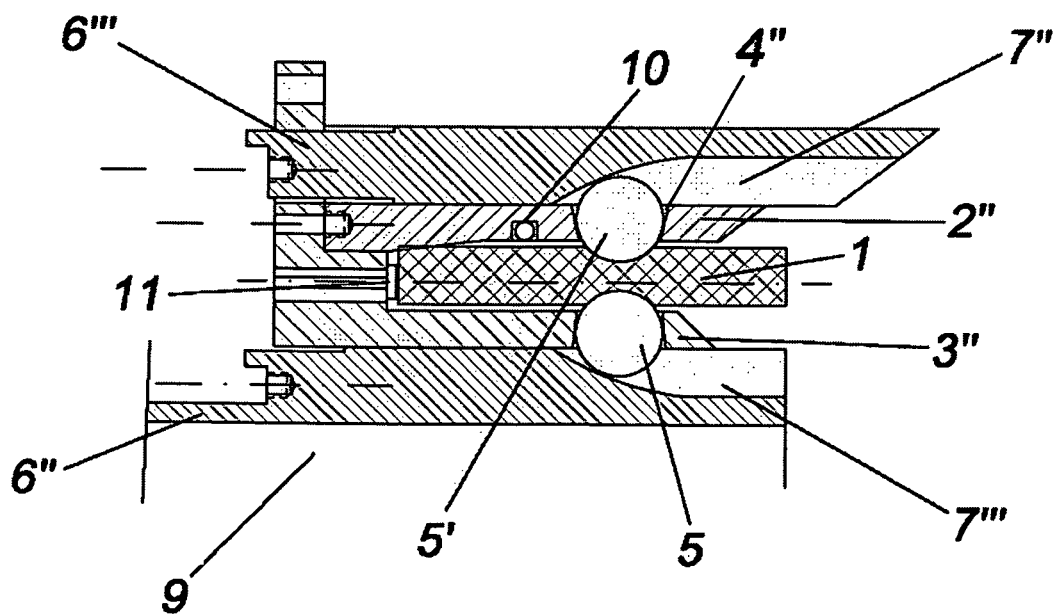

According to a third embodiment of the invention shown in FIGS. 6 and 7, in this case the plastic pipe (1) is gripped by the action of two lines of balls (5, 5') that face each other. The mechanism has the drilled piece (3") situated inside the pipe (1) in which the grooved piece (6") moves, and it has the fixed tubular piece (2") situated outside the pipe that is drilled and has tapered radial holes (4") to house the second line of balls (5') in addition to the first line of balls (5). Complementarily, it has a second grooved piece (6''') situated outside the fixed tubular piece (2") with channels (7''') in which the balls (5') of this second line move.

The axial actuator (not shown here), which brings about the movement of the grooved pieces (6", 6'''), can be a single actuator for both pieces if they are solidly joined, or it can be independent for each of them.

The joint (10) to maintain the pressure inside the pipe (1) is situated on the fixed tubular piece (2").

The invention claimed is:

1. A gripping and releasing mechanism of blank pipes in a mould for expanding said blank pipes whereby the gripping is done prior to the expanding of said blank pipes which produces their molecular orientation, comprising:
    a drilled tubular piece, which is provided with tapered radial holes in which a first line of rigid balls are partially housed and can move in a radial direction;
    at least one grooved tubular piece, which is provided with longitudinal channels in which the balls are partially housed and which are slightly wider than the diameter of the balls with a variable depth, that can move axially in relation to the drilled piece causing the radial movement of the balls, and
    a fixed tubular piece concentric to the drilled tubular piece which is adapted to receive the end of the pipe in combination with said drilled tubular piece and to grip and deform the end of the pipe when the balls move in one direction towards the pipe and to release the pipe when the balls move in the opposite direction,
    wherein the part of an inner face of the fixed tubular piece that corresponds with a position of the pipe against which the ball rests, has a rough surface that improves the grip of the pipe between the balls and the fixed tubular piece.

2. A gripping and releasing mechanism of blank pipes in a mould for expanding said blank pipes whereby the gripping is done prior to the expanding of said blank pipes which produces their molecular orientation, comprising: a drilled tubular piece, which is provided with tapered radial holes in which a first line of rigid balls are partially housed and can move in a radial direction; at least one grooved tubular piece, which is provided with longitudinal channels in which the balls are partially housed and which are slightly wider than the diameter of the balls with a variable depth, that can move axially in relation to the drilled piece causing the radial movement of the balls, and a fixed tubular piece concentric to the drilled tubular piece which is adapted to receive the end of the pipe in combination with said drilled tubular piece and to grip and deform the end of the pipe when the balls move in one direction towards the pipe and to release the pipe when the balls move in the opposite direction, and further comprising a detector located between the drilled piece and the fixed tubular piece acting as a detection element of a predetermined position of the pipe that acts as a limit against which the pipe rests, thus detecting said predetermined position for a subsequent gripping thereof.

3. A gripping and releasing mechanism of blank pipes in a mould for expanding said blank pipes whereby the gripping is done prior to the expanding of said blank pipes which produces their molecular orientation, comprising:
    a drilled tubular piece, which is provided with tapered radial holes in which a first line of rigid balls are partially housed and can move in a radial direction;
    at least one grooved tubular piece, which is provided with longitudinal channels in which the balls are partially housed and which are slightly wider than the diameter of the balls with a variable depth, that can move axially in relation to the drilled piece causing the radial movement of the balls, and
    a fixed tubular piece concentric to the drilled tubular piece which is adapted to receive the end of the pipe in combination with said drilled tubular piece and to grip and deform the end of the pipe when the balls move in one direction towards the pipe and to release the pipe when the balls move in the opposite direction, wherein the grooved piece has an axial hole for connecting an inside part of the pipe with an outside part of the mould, thus facilitating the passage of an expansion fluid that causes the blank pipe to expand.

4. The gripping and releasing mechanism of claim 1, wherein the fixed tubular piece includes an elastic joint for sealing the blank pipe that is to be expanded.

5. The gripping and releasing mechanism of claim 1, wherein the drilled piece includes the first line of balls and is located outside a plastic pipe and inside the grooved piece, the fixed tubular piece being located inside the plastic pipe.

6. The gripping and releasing mechanism of claim 1, wherein the drilled piece that includes the first line of balls is located inside the pipe, the grooved piece moving therein, and the fixed tubular piece is located outside the pipe, being drilled and having tapered radial holes that house a second line of balls in addition to the first line of balls, and it has a second grooved piece located outside the fixed tubular piece with channels in which the balls of this second line move.

\* \* \* \* \*